W. H. HENDERSON.
Baking Device.

No. 229,314.    Patented June 29, 1880.

Witnesses.
Fred Werbe
F. M. McDonald

Inventor
William H. Henderson
by
C. E. McDonald
attorney in fact

UNITED STATES PATENT OFFICE.

WILLIAM H. HENDERSON, OF GREENWOOD, INDIANA.

BAKING DEVICE.

SPECIFICATION forming part of Letters Patent No. 229,314, dated June 29, 1880.

Application filed August 1, 1879.

*To all whom it may concern:*

Be it known that I, WILLIAM H. HENDERSON, of Greenwood, in the county of Johnson and State of Indiana, have invented an Improvement in Baking Devices for Cook-Stoves, of which the following is a specification.

The nature and object of the invention will be fully understood from the following general description and the annexed drawings.

Figure 1:
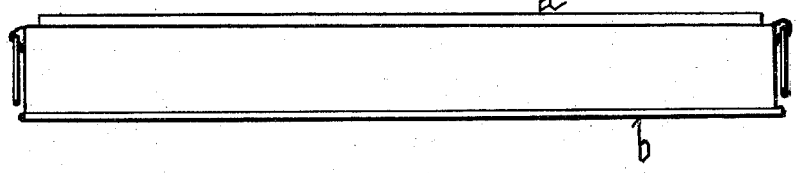
Figure 2:
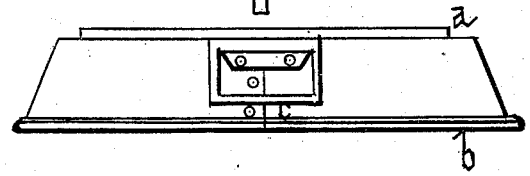
Figure 3:
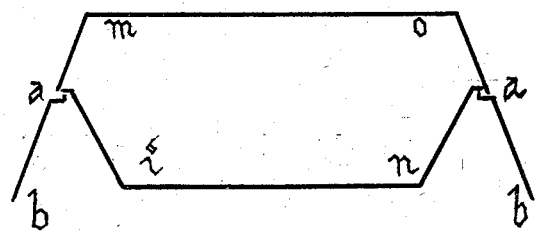

Figure 1 is a side view of the device; Fig. 2, an end view of the same; Fig. 3, a sectional view, showing the use of said device.

The device consists of a form or frame made of sheet metal, cast metal, or any other suitable material. This frame or form may be either annular or rectangular. I prefer a rectangular form of galvanized sheet-iron, made of two pieces, with an edge or flange turned in, as at $a$, and with the ends riveted together, as shown at $c$, Fig. 2. Such a one is shown in the drawings by $a\,b$ of Fig. 1, $a\,b\,c$ of Fig. 2, and in section by $a\,b$ of Fig. 3.

To use this device it is placed in a heated oven of a cook-stove in convenient position, with the edge $b$ down. An ordinary sheet-metal bread-pan, (represented in section at $i\,n$ of Fig. 3,) having been filled with bread, meat, or other material to be baked, is set in with its edge resting on the top $a$ of the device $a\,b$, as shown in section in said Fig. 3. Over all this, and covering the pan $i\,n$, is placed an ordinary sheet-metal bread-pan, $m\,o$, with its top down and its edge resting on the top $a$ of the device $a\,b$, as shown in section in said Fig. 3. As before observed, this is to be all so arranged in the heated oven of a cook-stove.

It will now be found, if a clear good fire be kept up, that without any further attention the material baking in the oven will be nicely browned, but not burned. On account of being closed, much of the natural flavor of the material will be preserved, so that the taste of the article when cooked will be much superior to anything cooked in the ordinary way.

If sufficient water be added in the pan $i\,n$ at the time it is put in the oven, the material will be cooked in steam.

I claim—

The device $a\,b\,c$ aforesaid, provided with supporting-flange, in combination with two ordinary sheet-metal bread-pans for baking, constructed, arranged, and used substantially as and for the purpose set forth.

In testimony that I claim the foregoing specification as mine I have hereunto set my hand this 8th day of May, 1879.

WM. H. HENDERSON.

Attest:
 FRED WERBE,
 F. M. McDONALD.